(12) United States Patent
Shin et al.

(10) Patent No.: US 9,380,714 B2
(45) Date of Patent: Jun. 28, 2016

(54) PORTABLE TERMINAL WITH CRACK PREVENTION STRUCTURE FOR DISPLAY DEVICE

(71) Applicant: Samsung Electronics Co., Ltd, Gyeonggi-do (KR)

(72) Inventors: Hyun-Suk Shin, Gyeonggi-do (KR); Seok-Gyu Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 13/827,701

(22) Filed: Mar. 14, 2013

(65) Prior Publication Data

US 2013/0286601 A1   Oct. 31, 2013

(30) Foreign Application Priority Data

Apr. 27, 2012   (KR) ................. 10-2012-0044366

(51) Int. Cl.
| | |
|---|---|
| *H05K 7/00* | (2006.01) |
| *H05K 5/00* | (2006.01) |
| *G02F 1/1333* | (2006.01) |
| *H04M 1/02* | (2006.01) |
| *H04M 1/18* | (2006.01) |

(52) U.S. Cl.
CPC ........ *H05K 5/0017* (2013.01); *G02F 1/133308* (2013.01); *H04M 1/0266* (2013.01); *H04M 1/185* (2013.01); *G02F 2201/503* (2013.01)

(58) Field of Classification Search
CPC .................................................. H05K 5/0017
USPC ................................ 361/679.26, 728; 349/58
See application file for complete search history.

(56) References Cited

U.S. PATENT DOCUMENTS

| | | | |
|---|---|---|---|
| 5,606,438 A * | 2/1997 | Margalit et al. .................. 349/60 |
| 5,804,780 A * | 9/1998 | Bartha .......................... 200/5 A |
| 6,327,011 B2 | 12/2001 | Kim | |
| 6,611,302 B1 * | 8/2003 | Ueda et al. ...................... 349/58 |
| 6,677,542 B2 * | 1/2004 | Katakami ..................... 200/5 A |
| 7,535,698 B2 * | 5/2009 | Iwamoto et al. ......... 361/679.55 |

(Continued)

FOREIGN PATENT DOCUMENTS

| | | |
|---|---|---|
| EP | 1235098 A2 | 8/2002 |
| EP | 1988689 A1 | 11/2008 |

(Continued)

OTHER PUBLICATIONS

Extended European Search Report dated Aug. 5, 2013 in connection with European Patent Application No. 13165781.9, 8 pages.

(Continued)

*Primary Examiner* — Dion R Ferguson
*Assistant Examiner* — Mandeep S Buttar (57) ABSTRACT

A portable terminal includes a display module and a case member coupled to the display module. A face of the case member is formed to have a center portion and an edge, which are different from each other in their heights to thereby support a center portion of the display module in lengthwise and widthwise directions of the display module respectively. The portable terminal configured above supports a rear face of the flat display module using at least one of a portion protruded from the case member and a stiff material film, to thereby diffuse an impact exerted on a display device to the case member. Thus, it is possible to relieve the damage to the flat display device due to an external impact.

21 Claims, 4 Drawing Sheets

(56) References Cited

U.S. PATENT DOCUMENTS

| | | | |
|---|---|---|---|
| 7,940,520 B2* | 5/2011 | Bhutani | 361/679.21 |
| 2002/0015806 A1 | 2/2002 | Kim | |
| 2006/0209228 A1* | 9/2006 | Nishida | 349/59 |
| 2008/0062722 A1* | 3/2008 | Wang et al. | 362/633 |
| 2010/0246163 A1* | 9/2010 | Chen | G02B 6/0088 362/97.1 |
| 2010/0253880 A1 | 10/2010 | Sasaki et al. | |
| 2012/0026424 A1* | 2/2012 | Youk | G02B 6/0083 349/62 |
| 2013/0342429 A1* | 12/2013 | Choi | H05K 13/00 345/30 |

FOREIGN PATENT DOCUMENTS

| | | |
|---|---|---|
| JP | 2000016122 A * | 1/2000 |
| JP | 2007-110322 | 4/2007 |
| JP | 2007110322 A * | 4/2007 |
| JP | 2008-089839 | 4/2008 |
| KR | 10-1998-0066371 | 10/1998 |
| KR | 10-1999-0070453 | 9/1999 |
| KR | 10-2001-0064891 | 7/2001 |
| KR | 10-2005-0054547 | 6/2005 |
| KR | 10-2006-0004485 | 1/2006 |
| KR | 10-2006-0014783 | 2/2006 |
| KR | 10-2006-0101689 | 9/2006 |
| KR | 20-2010-0050201 | 5/2010 |
| KR | 10-2012-0006400 | 1/2012 |

OTHER PUBLICATIONS

International Search Report dated Jun. 17, 2013 in connection with International Patent Application No. PCT/KR2013-001419, 4 pages.
Written Opinion of the International Searching Authority dated Jun. 17, 2013 in connection with International Patent Application No. PCT/KR2013-001419, 6 pages.

* cited by examiner

PORTABLE TERMINAL WITH CRACK PREVENTION STRUCTURE FOR DISPLAY DEVICE

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Apr. 27, 2012 and assigned Serial No. 10-2012-0044366, the entire disclosure of which is incorporated herein by reference.

TECHNICAL FIELD OF THE INVENTION

The present disclosure relates generally to a portable terminal, and more particularly, to a portable terminal with a crack prevention structure against external impact and the like.

BACKGROUND OF THE INVENTION

Generally, the portable terminal refers to a device making it possible to perform: a function of communication with the other users, such as voice communication, SMS transmission and the like; a function of data communication, such as Internet surfing, mobile banking, multimedia file transmission and the like; and, a function of entertainment, such as gaming, music playback and moving picture playback, while a user carry the portable terminal with him or her. It is common to make the portable terminal specialized for the communication function, the game function, the multimedia function, the electronic scheduler and the like. Recently, however, various kinds of functions are enjoyable only with a mobile communication terminal thanks to the development in the electric/electronic technology and the communication technology.

The portable terminal includes a keypad, a display device, a mouthpiece, an earpiece, and the like as an input/output device. Of course, with the addition of a separate speaker phone, a more abundant sound may be outputted in the game or the multimedia function. Generally the keypad has the configuration in which the user manipulates operation buttons in a physical way. However, with the generalization of a display with onboard touch-screen function in recent times, the touch screen display device has replaced the keypad. Thereby, it is possible to reduce a size of the portable terminal by eliminating the physical keypad and utilizing a space provided for the keypad, while enlarging a screen size of the display device.

Figure 1:
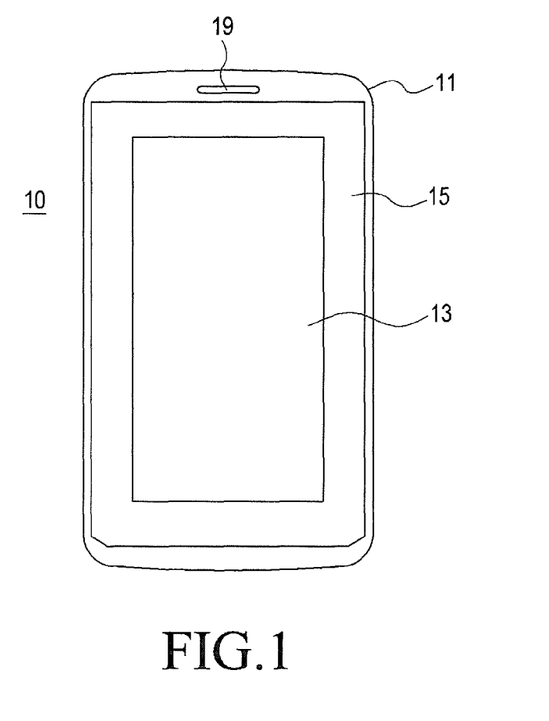
FIG. 1 illustrates a top-view of a portable terminal according to some examples.
Figure 2:
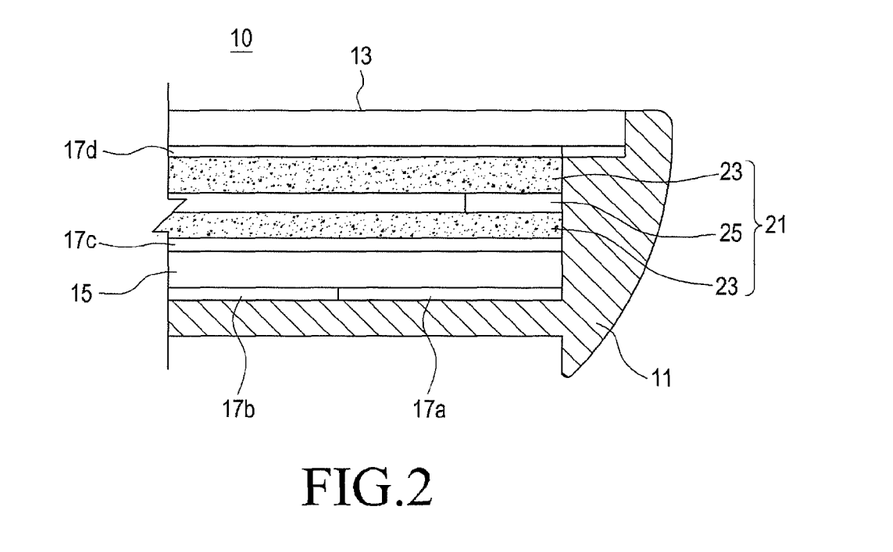
FIG. 2 illustrates a cross-sectional view of the portable terminal shown in FIG. 1.

FIG. 1 is a top view of a portable terminal 10 according to an illustrative example and FIG. 2 is a cross-sectional view of the portable terminal 10 illustrated in FIG. 1.

As illustrated in FIG. 1, the portable terminal 10 according to an illustrative example has a window member 13 installed on a front face of a case member 11 and a speaker device 19 for outputting sound, installed on an upper side. In the voice communication, the speaker device 19 may be used as a receiver. A flat display module 21 (FIG. 2) is installed inside of the window member 13, wherein the display module 21 is attached to the case member 11 through a sponge member 15.

Herein-below, a structure for installing the display module 21 will be detailed with reference to FIG. 2. As shown in FIG. 2, the display module 21 is disposed between the window member 13 and the case member 11.

The display module 21 is included in a space enclosed by the window member 13 and the case member 11, wherein a front face of the display module is attached to the window member 13 and a rear face of the display module is attached to the case member 11, so that the display module is fixed in the terminal 10. The window member 13 has an edge attached to the case member 11 by way of adhesive or double sided adhesive tape cut to correspond to a bezel shape. As the front face of the display module 21 needs to display images, optical adhesive or optical adhesive film 17d is used for attaching the front face of the display module 21 to the window member 13.

A mesh tape 17c is attached to the rear face of the display module 21, and the sponge member 15 is attached to the rear face of the display module 21 along an edge thereof by way of the mesh tape 17c. Also, the sponge member 15 is attached to a front face of the case member 10 by way of a double sided adhesive tape. Thereby, the display module 21 is fixed within the terminal 10. Additionally, a heat-radiant sheet 17b may be attached to the area surrounded by the sponge sheet 17b on the front face of the case member 11. The heat-radiant sheet 17b partially replaces the double-sided adhesive tape 17a to make the sponge member 15 attached to the case member 11.

The portable terminal configured-above has such a problem as transferring an impact to the display module through the window member when it is subjected to the impact due to a fall. Referring to FIG. 2 again, the flat display module is typically configured to have a pair of panels 23 arranged to face each other with a predetermined distance there-between and a cell seal 25 filling a space formed between the panels.

When the impact is applied to the flat display module without dispersing the external impact, the display module becomes deformed in a wavelike shape to transfer the impact. This type of impact wave reaches the edge of the display module to thereby damage the cell seal or cause a crack in the panels included in the display module. The display module damaged in this way is discolored, so that it becomes impossible to display a normal image or leads to a malfunction.

The above information disclosed in this Background section is only for enhancement of understanding of the background of the invention and therefore it may contain information that does not constitute prior art that is already known in this country to a person of ordinary skill in the art.

SUMMARY OF THE INVENTION

To address the above-discussed deficiencies, it is a primary object to provide a portable terminal to relieve the damage to a flat display module due to the external impact.

Also, the present disclosure is to provide a portable terminal which has the improved durability and reliability by relieving the damage to the display module due to the external impact.

In one aspect, the present disclosure provides a portable terminal including: a display module; and a case member coupled to the display module; wherein a face of the case member is formed to have a center portion and an edge, which are different from each other in their heights to thereby support a center portion of the display module in lengthwise and widthwise directions of the display module respectively.

In another aspect, the present disclosure provides a portable terminal including: a display module; a case member coupled to the display module; and, a first member disposed between the display module and the case member; wherein the first member is attached to a face of the case member by way of an adhesive member, while the first member supports at least a center portion of the display module in a lengthwise direction and in a widthwise direction respectively.

In a preferred embodiment, the adhesive member is made of heat radiant sheet and the first member is made of synthetic material.

In another aspect, the present disclosure provides a portable terminal including: a display module; a case member coupled to the display module; and a first member attached to a face of the display module by way of a mesh tape; wherein a face of the case member is formed to have a center portion and an edge, which are different from each other in their heights to thereby support a center portion of the display module in lengthwise and widthwise directions of the display module respectively with the first member disposed therebetween.

In another preferred embodiment, the first member is a stiff material film made of synthetic resin.

Other aspects and preferred embodiments of the disclosure are discussed infra.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
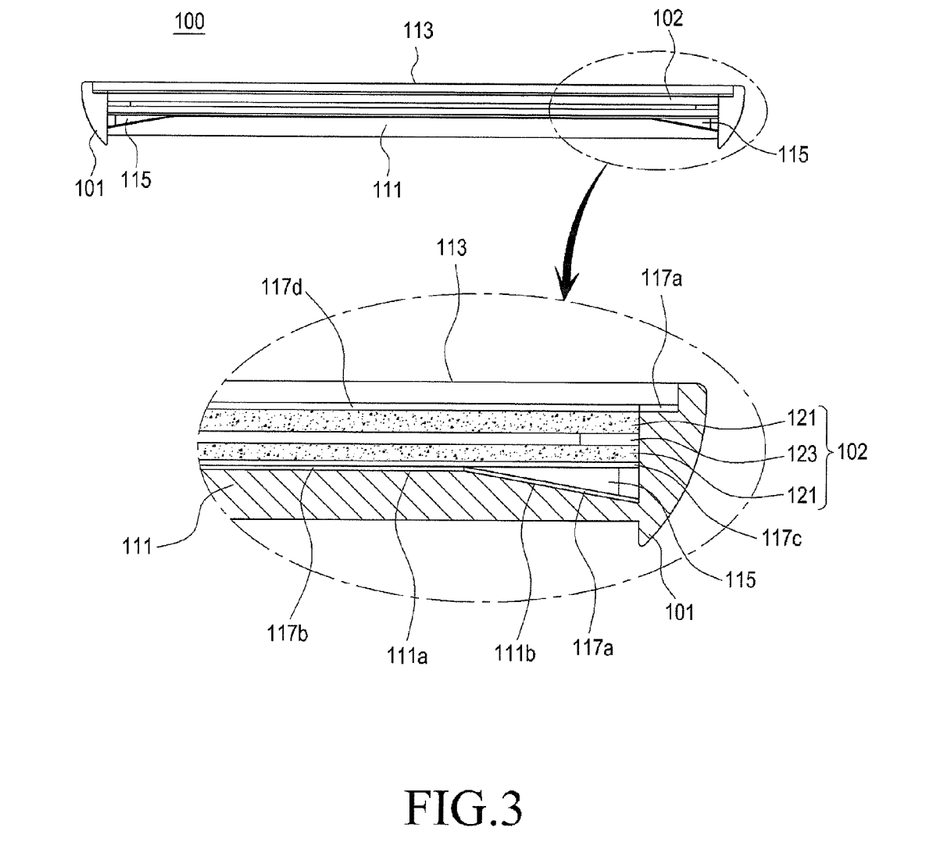
FIG. 3 illustrates a cross-sectional view of a preferred embodiment of the present disclosure.

As illustrated in FIG. 3, a portable terminal 100 according to a preferred embodiment of the present disclosure has a portion of a front face of a case member 101 protruded to thereby support a rear face of a display module 102.

The case member 101, which is provided for receiving all kinds of circuit devices, input and output devices and a battery pack, is coupled to a display module 102. As the display module 102 is an output device for displaying the image, it is installed at a front face. The case member 101 is generally made from synthetic resin material, but the case member 101 may be made from metallic material, such as magnesium and etc. A rear face of the case member 101 is formed with a space for receiving the battery pack or a circuit substrate, and a cover member (not shown) is used to protect the battery pack or the circuit substrate.

The front face of the case member 101, i.e., the face opposing a rear face of the display module 102 has a portion 111 protruded to thereby support the rear face of the display module. The protruded portion 111 of the case member 101 serves as a flat portion 111a for directly supporting the rear face of the display module 102, and the case member 101 has a inclined portion 111b, which is arranged to surround the flat portion 111a and which gradually grows distant from the rear face of the flat display module 102 as the inclined portion 111b approaches an edge. Here, as the display module 102 has a flat shape, the portion supporting the rear face of the display module 102 is formed as the flat portion 111a. However, the front face of the case member 101 may be formed to have a curved surface with a predetermined radius of curvature to thereby support the rear face of the display module 102. It is preferred that the portion of the case member 101 supports a center portion of the display module 102 in a lengthwise direction and a widthwise direction of the display module 102 respectively. Here, it is preferred that a difference between a nearest distance and a farthest distance is equal to or less than 0.3 mm, wherein the distance is defined between the face of the case member 101 and the rear face of the display module 102. For instance, if the portion supporting the rear face of the display module 102, i.e., the flat portion 111a contacts the rear face of the display module 102, the distance between the edge of the display module 102 and the front face of the case member 101 is set to be 0.3 mm. In other words, the front face of the case member 101 shown in FIG. 3 is formed to have the difference in height, which is equal to or less than 0.3.

The portable terminal 100 has a window member 113 mounted on the front face of the case member 101, and the display module 102 is installed within a space surrounded by the window member 113 and the case member 101. The window member 113 protects the display module 102 against the external environment, while allowing the images attained by the display module 102 to be transmitted. An adhesive member 117a, such as the double-sided tape is provided in a bezel zone of the window member 113, i.e., on an inner surface along the edge, to thereby attach the window member 113 to the case member 101 for fixation.

The display module 102 is implemented by coupling a pair of panels 121 to face each other with a distance there-between. Here, cell seal 123 is disposed between the panels 121, so that a space is established between the panels 121, while the sealing is implemented. In other words, the cell seal 123 is arranged along an edge of the display module 102. In order to stably secure the display module 102 within the terminal 100, the window member 113 and the case member 101 are attached to the front and rear face of the display module, respectively.

Figure 6:
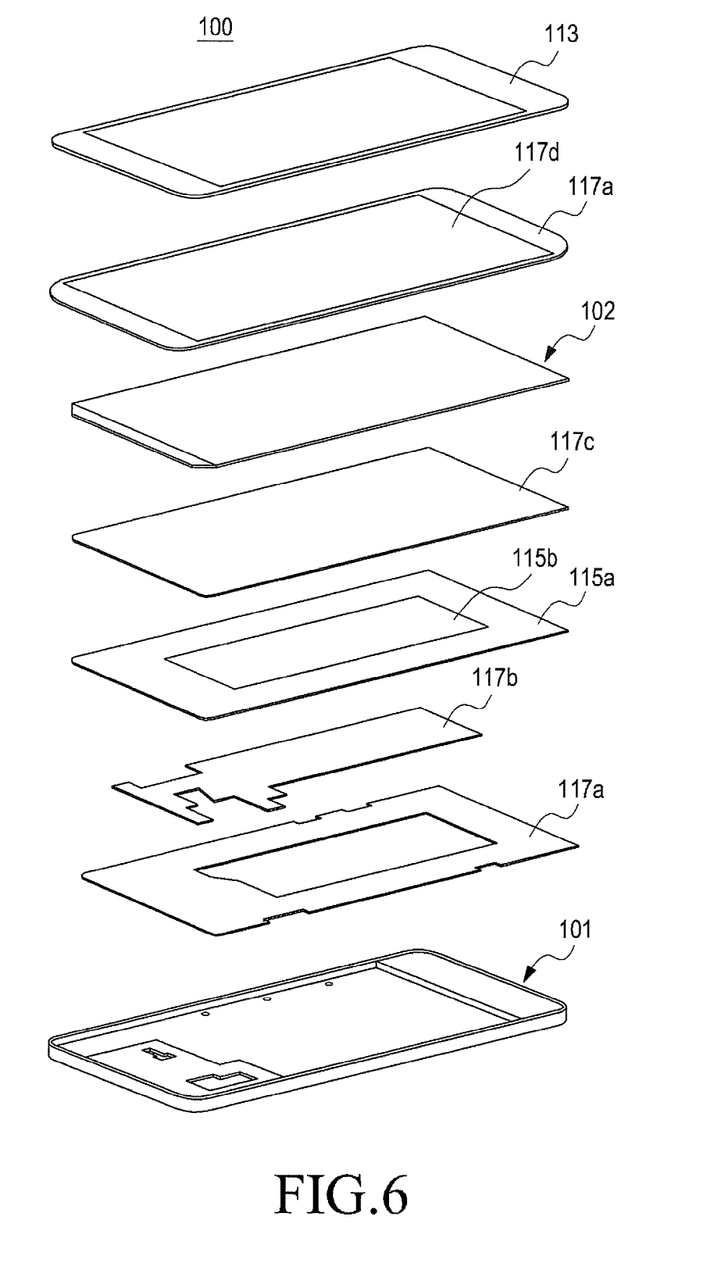
FIG. 6 illustrates an exploded perspective view of the portable terminal shown in FIG. 4.

As the front face of the display module 102 serves to output the image, the optical adhesive or the optical adhesive film 117d is used to make the front face of the display module attached to the window member 113. Since the optical adhesive or the optical adhesive film 117d has the high transmittance, it is possible to output the better quality of the image, while providing the adhesiveness between the display module 102 and the window member 113. Referring to FIG. 6, the optical adhesive or the optical adhesive film 117d is arranged to be surrounded by the adhesive member 117a for attaching the window member 113 to the case member 101. The optical adhesive or the optical adhesive film 117d may have the same thickness as the adhesive member 117a. However, depending on the installation height of the display module with respect to the front face of the case member 101, the thickness of the optical adhesive or the optical adhesive film 117d may be set differently from that of the adhesive member 117a.

A sponge member 115 may be disposed between the display module 102 and the case member 101. In order to attach the sponge member 115 to the display module 102 and the case member 101, the terminal 100 includes a mesh tape 117c and a further adhesive member 117a. Here, a double-sided adhesive tape is used as the adhesive member for attaching the window member 113 to the case member 101 and as the adhesive member for attaching the sponge member 115 to the case member 101.

The sponge member 115 is attached to the display module by the mesh tape 117a, which is provided on a face of the display module 102, specifically on a whole area of the rear face thereof. The sponge module 115 is disposed on the rear face of the display module 102 along the edge thereof. More specifically, the sponge member 115 is positioned on an inclined portion 111b of the case member 101 to surround the flat portion 111a. Also, the sponge member 115 is disposed at a location corresponding to the cell seal 123 on the display module 102. On the other hand, the mesh tape 117c may be directly attached to the flat portion 111a, and the heat-radiant sheet 117b is disposed between the mesh tape 117c and the flat portion 111a. The heat-radiant sheet 117b diffuses the heat caused by every type of the integrated-circuit chips within the terminal 100 throughout the case member 101, so that heat-radiant sheet 117b reduces heat caused by the integrated-circuit chip from being concentrated on a certain area.

Meanwhile, a stiff material film 115b that is described in an embodiment herein-below is disposed between the display module 102 and the case member 101. In this case, the stiff material film 115b is disposed within a zone surrounded by the sponge member 115, and is attached to the display module 102 by way of the mesh tape 117c. The stiff material film 115b may be attached to the case member 101 by way of the heat-radiant sheet 117b. In other words, the heat-radiant sheet 117b serves to diffuse the heat generated from the terminal 100 and to make the stiff material film 115b attached to the case member 101.

Here, the stiff material film 115b may relieve the impact transferred to the edge of the display module 102 by transferring the impact exerted on the display module 102 from a center of the display module 102 to the case member 101. Synthetic resin, such as polyethylene terephthalate (PET) may be used as the stiff material film 115b. Since PET material has a flexibility when PET material is made in the shape of a film, the processing thereof and the attachment to the rear face of the display module 102 are convenient. Also, the film made of PET material may maintain the stiffness in a local area, the film made of PET material is available to transfer the impact exerted on the display module 102 to the case member 101.

If a portion of the case member 101 protrudes to support the rear face of the display module 102, the stiff material film 115b is selectively used. As described in the preferred embodiment, the flat portion 111a of the case member 101 is directly attached to the rear face of the display module 102 by way of the heat radiant sheet 117b or the mesh tape 117c, so that the impact exerted on the display module 102 may be transferred from the center portion of the display module 102 to the case member 101.

As described before, the center portion of the display module 102 is supported by protruding the portion of the case member 101 or by using the stiff material film 115b, while the entire rear face of the display module 102 is attached to the case member 101. This installation structure of the display module 102 allows the impact exerted on the display module 102 to be diffused toward the case member 101 to thereby prevent the impact from being transferred up to the edge of the display module 102. In addition, an area as large as possible, more preferably the entire rear face of the display module 102 is attached to the case member 101, so that the wavelike deformation of the display module 102 may be prevented. Therefore, it is possible to prevent the impact exerted on the display module 102 from being transferred to the edge of the display module 102.

Figure 4:
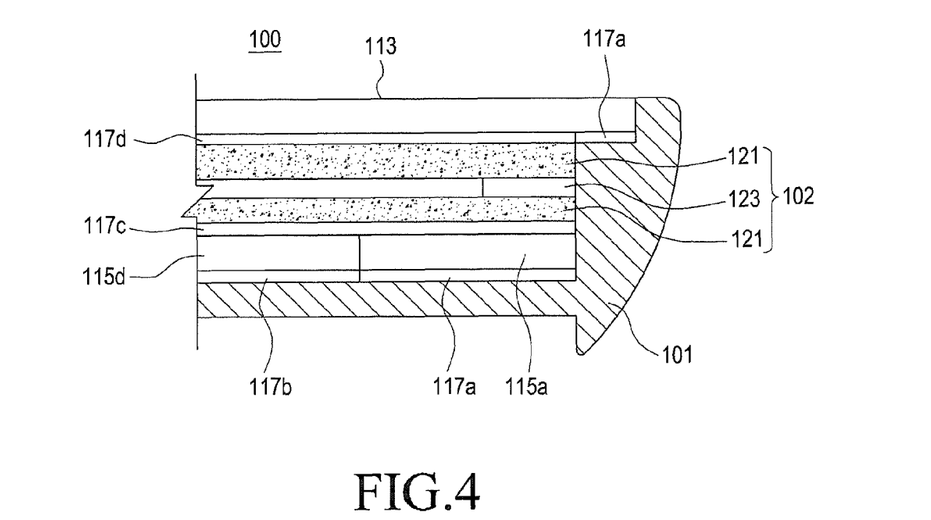
FIG. 4 illustrates a cross-sectional view of a second preferred embodiment of the present disclosure.
Figure 5:
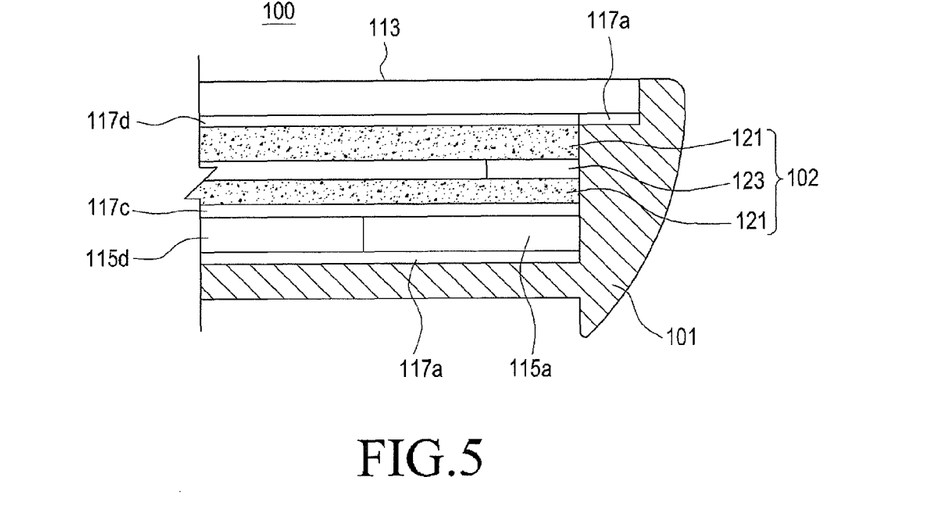
FIG. 5 illustrates a cross-sectional view of a portable terminal according to a variant of the portable terminal shown in FIG. 4.

FIG. 4 illustrates a cross-sectional view of a portable terminal 100 according to a second preferred embodiment of the present disclosure and FIG. 5 is a cross-sectional view of the portable terminal 100 according to the variant of the portable terminal 100 illustrated in FIG. 4. Also, FIG. 6 is an exploded perspective view of the portable terminal 100 illustrated in FIG. 4. In the portable terminal 100 illustrated in FIGS. 4 and 5, the case member 101 is formed with a flat front face; a first member is disposed between the display module 102 and the case member 101; and the display module 102 is attached to the case member 101 for fixation by way of the first member and the adhesive member.

The terminal 100 may further include a second member. The second member is also disposed between the display module 102 and the case member 101, and arranged to surround the first member, while being positioned along the edge on the face of the display module 102. In other words, the first member is made to support the center portion of the display module 102 on the face thereof.

Here, it is preferred that the first member is made of a material, which has the higher stiffness than that of the second material. For instance, the first member is manufactured with the stiff material film made of synthetic resin material, such as PET, whereas the second member is manufactured with sponge material. Herein-below, the embodiment will be described as an example, wherein the stiff material film 115b is used as the first member and the sponge member 115a is used as the second member.

The stiff material film 115b is disposed between the case member 101 and the display module 102 to thereby diffuse the impact exerted on the display module 102 to the case member 101.

In the structure of the embodiment illustrated in FIG. 3, the stiff material film 115 may be an optional element because the protruded portion of the case member 11 supports the rear face of the display module 102. In the portable terminal 100 illustrated in FIGS. 4 and 5, however, the front face of the case member 101 is formed to be flat and the stiff material film 115b is disposed between the display module 102 and the case member 101, to thereby diffuse the impact exerted on the display module 102 to the case member 101. As described-before, the stiff material film 115b is manufactured using PET material. In the description of the portable terminals 100 illustrated in FIGS. 4 and 5, the details will be omitted regarding the configuration that may be readily understood by way of the preceding embodiment illustrated in FIG. 3 and the reference numerals in the drawings may be omitted, either.

The stiff material film 115b is attached to the rear face of the display module 102, while the stiff material film 115b is in a state of being surrounded by the sponge member 115a. The sponge member 115a is arranged on the rear face of the display module 102 along the edge, and it the sponge member 115a positioned on the same layer as the stiff material film 115b as illustrated in FIGS. 4 and 5. The stiff material film 115b is attached to the rear face of the display module 102 by way of the mesh tape 117c together with the sponge member 115a. The mesh tape 117c is provided on the entire rear face of the display module 102. The adhesive tape members 117a and 117b, such as the double-sided adhesive tape and the heat radiant sheet may be utilized when attaching the sponge member 115a and the stiff material film 115b to the case member 101. Instead of the portion 111 protruded from the case member 101 as in the embodiment shown in FIG. 3, the stiff material film 115b supports the rear face of the display module 102, and thus it is preferred that the stiff material film 115b has a thickness equal to or less than 0.3 mm.

In the embodiment illustrated in FIG. 4, the stiff material film 115b is attached to the case member 101 by way of the heat-radiant sheet 117b and the sponge member 115a is attached to the case member 101 by way of the double-sided adhesive tape 117a. The heat-radiant sheet 117b serves to diffuse the heat generated within the terminal 100, while attaching the stiff material film 115b to the case member 101. Thereby, it is possible to prevent the heat generated within the terminal from being concentrated on a certain area.

FIG. 5 illustrates the structure in which the stiff material film 115b and the sponge member 115a are attached to the front face of the case member 101 at the same time by way of a single adhesive member, i.e., the double-sided adhesive tape 117a. If the diffusion of the impact exerted on the display module 102 is only taken into account, it is more preferable that the stiff material film 115b is attached to the case member 101 using only the double-sided adhesive film. This is because, when comparing to the double-sided adhesive tape, the heat radiant sheet 117b has the lower performance of diffusing the impact exerted on the display module 102 to the case member 101.

With regard to the choice of the heat-radiant sheet 117b or the double-sided tape 117a for attaching the stiff material film 115b to the case member 101, the choice should be appropriately done in consideration of the exothermic property, the impact resistance and etc. Also, with regard to the attachment to the case member 101 by way of the adhesive member, such as the mesh tape 117c or the double-sided tape 117a, it is preferable to use the adhesive member on an area as large as possible. If the attachment area of the display module 102 to the case member 101 is enlarged, it is possible to prevent the impact from being transferred, along with the wavelike deformation of the display module 102 in the instant of the impact. The attachment area of the display module 102 to the case member 101 is determined as required, wherein wiring paths of a flexible printed circuit board for connecting the display module 102 to circuit devices disposed on the rear face of the case member 101 should be secured.

The portable terminal as described above makes use of at least one of the portion protruded from the case member and the stiff material film to thereby support the rear face of the flat display module, so that the impact exerted on the display device may be diffused toward the case member before the impact reaches the edge of the display device. Thus, it is possible to relieve the flat display device from being damaged due to the external impact. Thereby, the impact-resistance and the reliability of the portable terminal may be enhanced and the cost for post-maintenance and repair may be saved. Also in the development of a product, the cost entrained in the developing a new product may be saved since a structure in preparation for the damage to the display module is stabilized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable terminal comprising:
   a display module; and
   a case member coupled to the display module, wherein a face of the case member fronting the display module comprises:
      a flat portion supporting a center portion of the display module when the portable terminal is in an orientation with the display module above the case member;
      an edge; and
      an inclined portion supporting the display module between the flat portion and the edge in the orientation, and
      wherein the inclined portion is further from the display module near the edge and closer to the display module near the flat portion.

2. The portable terminal of claim 1, wherein the face of the case member includes a curved surface with a predetermined radius of curvature.

3. The portable terminal of claim 1, wherein a difference between a nearest distance and a farthest distance is equal to or less than 0.3 mm, wherein the distance is defined between the face of the case member and a rear face of the display module.

4. The portable terminal of claim 1, further comprising:
   a first member provided on a rear face of the display module; and
   a second member provided on a rear face of the display module to be alongside of the first member, wherein the first member has the higher stiffness than that of the second member.

5. The portable terminal as claimed in claim 4, wherein the second member is provided along the edge on the face of the display module while surrounding the first member.

6. The portable terminal as claimed in claim 4, wherein the first member is synthetic resin material and wherein the second member is sponge material.

7. A portable terminal comprising:
   a display module;

a case member coupled to the display module;
a first member disposed between the display module and the case member, wherein the first member is attached to a face of the case member by way of an adhesive member, and wherein the first member supports at least a center portion of the display module when the portable terminal is in an orientation with the display module above the case member; and
a second member disposed between the first member and an edge of the case member, and between the display module and the case member, wherein the second member is arranged to surround the first member, and wherein the display module is coupled to the edge of the case member.

8. The portable terminal of claim 7, wherein the adhesive member is a heat-radiant sheet.

9. The portable terminal of claim 7, wherein the first member is synthetic resin material.

10. The portable terminal of claim 7, wherein the second member is sponge material.

11. The portable terminal of claim 7, wherein the adhesive member is a double-sided adhesive tape, and wherein the first member and the second member are attached to the face of the case member by way of the adhesive member.

12. A portable terminal comprising:
a display module;
a case member coupled to the display module;
a first member attached to a face of the display module by way of a mesh tape, and disposed between the face of the display module and the face of the case member, wherein a face of the case member fronting the display module comprises:
   a flat portion supporting a center portion of the display module when the portable terminal is in an orientation with the display module above the case member;
   an edge; and
   an inclined portion supporting the display module between the flat portion and the edge in the orientation; and
a second member disposed between the first member and an edge of the case member, and between the display module and the case member, wherein the second member is arranged to surround the first member, and
wherein the inclined portion is further from the display module near the edge and closer to the display module near the flat portion.

13. The portable terminal of claim 12, wherein the first member is a stiff material film made of synthetic resin.

14. The portable terminal of claim 12, wherein the first member is attached to the face of the case member by way of an adhesive member.

15. The portable terminal of claim 14, wherein the adhesive member is a heat-radiant sheet.

16. The portable terminal of claim 12, wherein the second member is sponge material.

17. The portable terminal of claim 12, wherein the second member is attached to the face of the case member by way of the adhesive member along with the first member.

18. The portable terminal of claim 12, wherein the display module comprises:
a pair of panels arranged to face each other with a distance there-between; and
a cell seal provided between the panels and sealing the panels along edges of the panels,
wherein the second member is provided on the cell seal along the edge on the face of the display module.

19. The portable terminal of claim 12, further comprising:
a window member disposed on a front face of the display module, wherein the display module is attached to an inner face of the window member by one of optical adhesive and an optical adhesive film.

20. The portable terminal of claim 1, further comprising:
at least one material between the display module and the case member.

21. The portable terminal of claim 20, wherein more materials of the at least one material are between the display module and the inclined portion of the case member than the display module and the inclined portion of the case member.

* * * * *